United States Patent Office 2,734,827
Patented Feb. 14, 1956

2,734,827

FIRE-RESISTANT PROTECTIVE COATING

Robert M. Hooks, Fort Worth, Tex., assignor to Southwestern Petroleum Co., Inc., Fort Worth, Tex., a corporation of Texas No Drawing. Application June 26, 1952,
Serial No. 295,847

4 Claims. (Cl. 106—15)

This invention relates to a fire-resistant coating which is particularly effective for preventing fire damage to wooden structures as well as providing waterproofing and weatherproofing protection to them.

Asphalt-base compositions which may be applied as coatings either by spraying or by brush are conventional. Bituminous substances such as asphalt which are used in formulating such compositions have a melting point of from 160° to 180° F. The waterproofing characteristics of such coatings are well known, as are their weather-resistant characteristics.

An object of the invention is to render a bituminous-base coating substantially immobile under the influence of heat above its fusion point and to disperse flame-retardant material uniformly throughout the body of the coating. The flame retardant is particularly effective by virtue of the uniformity of its dispersion throughout the coating and because no portion of the structure covered is devoid of such protection even where the coating is subjected to temperatures substantially above the fusion point of the bituminous base.

A further object of the invention is to render available a coating material having the above described desirable characteristics which can be sprayed as well as spread by mechanical means over the desired surface.

It should be mentioned here that bituminous-base coatings possessing a high melting point and good flow resistance characteristics at high temperatures together with fire-retardant ingredients incorporated therein are not novel in a broad sense. Attempts have been made heretofore to accomplish the end sought herein by incorporating in a bituminous-base composition granules of crude volcanic glass together with small amounts of flame-smothering gases. When subjected to high temperatures the glass particles expand and form a layer or crust over the surface of the coating which is intended to function as a flame-impermeable insulating mat. Short asbestos fibers are preferably embodied in these prior art protective coatings to raise the high-temperature flow resistance thereof and to toughen the crust or film formed by the expanded glass granules.

My improved coating affords exceptional fire resistance to vertical or steeply inclined inflammable surfaces in addition to its waterproofing function. Under the influence of heat the asphalt does not become molten and hence cannot flow from the surfaces to be protected. At the same time the fire retardant uniformly dispersed throughout the coating is held in place and capable of functioning throughout the heated area during the period of heat application. Thus the proofing against weather, water and flame remains constant throughout the surface to which the coating has been applied regardless of the inclination of such surface and regardless of surrounding conditions or temperatures.

Among contemplated uses for the invention are protective coatings for railroad bridge structures, telephone poles, fence posts and other wooden structures exposed to grass fires. Unless a coating used under such circumstances remains in its original state after exposure to a grass fire, for instance, it is necessary to reapply a coating after each exposure.

Grass fires do not generate such high temperatures as house fires or fires to which roofing products would be exposed. Thus the problem of protection must be approached in a somewhat different manner than in the case of conventional proofings against fire and water. Consideration must be given the fact that, while grass fires produce in some spots temperatures sufficiently high for coking, crusting, or slag forming, in others they produce only temperatures sufficiently high to cause flow or slippage of the asphalt coating on vertical wooden structures. My coating is particularly well suited to situations such as this, since it permits no movement of the asphalt or the coating as a whole under any conditions of temperature and thus remains intact to afford continuous waterproofing and fire-resisting properties.

My improved coating comprises an asphaltic vehicle, a fire-retarding chemical, an aerogel, and for some purposes asbestos fibers. The drying of such coating when applied depends upon volatilization of the solvent from the vehicle. In general a formulation of my improved composition may comprise the following, percentages being by weight: fire-retarding chemical 15–5%, asbestos fibers and/or other mineral fillers 5–15%, asbestos 3–5%, and a vehicle (which may consist of 48.5% bitumen and 51.5% chlorinated solvent) 70–75%.

Where an inflammable solvent is used, the ratio of asphalt to solvent in the vehicle will be different and under such circumstances the percentage would be approximately 60% asphalt and 40% solvent. This is explained by the fact that highly chlorinated solvents have exceptionally high specific gravities, and thus their weights per unit volume are much higher.

The use of silica aerogel, in addition to providing a gelling agent, permits the formulation of a coating sufficiently fluid to be sprayed. Other materials, such as asbestos fibers in greater quantum or ingredients which act chemically to yield infusible asphalt, might be used to render the asphalt immobile under the influence of heat, but the asbestos content in such a coating would not permit spraying and infusible asphalt would not lend itself to being conveniently compounded at all.

A typical formulation of my improved coating which has been effective under service conditions is as follows:

| | Percent |
|---|---|
| Ammonium carbonate | 5 |
| Ammonium sulphate | 10 |
| 7–D asbestos fiber | 6 |
| Silica aerogel | 4 |
| 165° F. melting point asphalt | 37.4 |
| Perchloroethylene | 37.6 |

The ingredients are blended together by melting the asphalt and stirring the perchloroethylene slowly into it. When the solution is cooled below the decomposition temperature of any of the fire retardants, such as the ammonium carbonate and ammonium sulphate suggested in the above typical formulation, the remainder of the dry ingredients are dispersed thoroughly in the solution by vigorous stirring. It is preferable to incorporate the silica aerogel into the solution first, since its finely divided particles are more readily dispersed in the asphalt-perchloroethylene solution in its more fluid state.

Dispersion of the aerogel, which is a finely divided powder composed of approximately 93–96% silicon dioxide and is described in Kistler Patent 2,093,454, is accomplished to the desired extent by stirring thoroughly into the vehicle with a suitable mixing apparatus. The aerogel particles in solution are colloidal in size. When the aerogel has been incorporated into the vehicle, it thickens the same to a state lying between a sol and a gel, or to either of these states depending on the consistency desired. A sol is considered to be a colloidal system or solution composed of a disperse phase, or the phase forming the particles, and a dispersion medium, or the medium in which the particles are distributed or dispersed.

The silica aerogel is silicon dioxide, the gel being in its expanded condition but dry. When the aerogel is mixed into the vehicle the "dry gel" is again wetted or solvated by the vehicle and causes the vehicle to increase markedly in viscosity. The thickening or gel formation in the vehicle is dependent entirely upon the amount of aerogel mixed with it.

During drying of the vehicle after application of the coating, the ratio of the aerogel to the asphalt increases to a point where the amount of aerogel in the dry asphalt is approximately 8–12%. At temperatures incident to its normal use asphalt is a solid, but upon exposure to heat it becomes molten and flows if not inhibited. By virtue of the presence of 8–12% silica aerogel, a firm gel is obtained when the asphalt becomes molten. The asphalt is gelled at temperatures below its melting point.

While in the preferred formulation set forth heretofore I have suggested the use of ammonium carbonate and ammonium sulphate as flame retardants, it should be understood that the particular nature of the flame retardant is not of paramount importance. Other fire retardants are classified as "intumescent," which indicates a tendency to bubble, and "spumific," which designates a frothing composition. The most important phase of the invention insofar as it relates to the use of fire retardants lies in the fact that the gel nature of the composition maintains the fire retardant evenly dispersed throughout the coating regardless of temperature.

Gas-releasing reagents such as ammonium sulphate and ammonium bicarbonate, which have been used as fire retardants in the preparation of my improved composition, seem also to function as spumescents. This is true of other gas-releasing chemicals.

The efficacy of my improved coating compared with a coating substantially identical in every way except for the absence of the gelled structure has been clearly established. Such coatings were applied to smooth fir boards which were placed in a vertical position before heat was applied and then subjected to temperatures ranging from 350° to 400° F. The ungelled coating bubbled or foamed vigorously and its surface was left in a pitted and roughened condition, the pitted positions remaining covered only by very thin layers of asphalt. Release of ammonia gas could be detected by its odor and the fact that the gas turned wet red litmus paper blue. The gelled coating bubbled or foamed to some extent, but this bubbling was barely perceptible, and ammonia gas was detected in the same manner as noted above. This barely perceptible bubbling produced a coating which retained its thickness and its original continuity substantially as it was before the application of heat.

Gelling the asphaltum to render it immobile under the influence of heat and to retain a fire retardant uniformly dispersed throughout obviates the need for coking, crusting, or slag formation of the asphalt. Elimination of such crusting, etc., permits release of minute bubbles of smothering gases slowly and evenly without breaking the continuity of the surface of the coating or reducing its thickness.

Asbestos fibers or other mineral fillers such as slate flour or ground limestone may aid when coating rough surfaces, since greater thicknesses may be applied with each application. When temperatures sufficiently high to cause carbonization of the asphalt occur, the asbestos fibers coalesce with the gel structure and aid in the formation of an insulating mat.

It should be borne in mind that the type of filler to be used is optional and controlled to a large extent by the particular use for which the coating is intended. The important feature of the invention resides in the fact that the gelled asphaltum remains firm and immobile at temperatures which would otherwise produce molten asphalt and at the same time retains in the dispersion medium a fire retardant, which latter is therefore released slowly and effectively without disrupting the body of the coating as a whole.

For improving the appearance of the coating I have found that the use of chlorinated paraffin is very desirable inasmuch as it imparts to the applied coating a glossy appearance and somewhat of an unctious feel. Without the chlorinated paraffin the coating may appear dull, harsh and dry.

Inasmuch as chlorinated paraffin may be classified as a fire retardant in that at elevated temperatures it releases flame smothering gases, it has been found desirable to utilize this material at least in part as a fire retardant in the heretofore described composition, thus obtaining the dual advantage of the two characteristics heretofore noted.

It is believed that the improved appearance developed through use of chlorinated paraffin for at least a portion of the fire-retardant phase of the composition may be attributable to its action as an internal lubricant and plasticizer. The waterproof characteristics as well as the gloss of the finished coating are likewise improved by use of chlorinated paraffin in part for fire-retardant purposes. The paraffin is a viscous liquid both above and below the melting point of the bitumen and its consistency when combined with the aerogel allows it to act as an internal lubricant and plasticizer, while at temperatures above the melting point of the bitumen it is retained within the gel structure as has heretofore been explained, thus precluding flow or movement of the coating as a whole.

For the purpose noted above, a paraffin chlorinated to the extent of between 20–50% by weight has yielded excellent results where used in quantities of from 1–5% of the coating composition.

While certain formulations have been set forth in the specification for illustrative purposes, it will be understood that the invention is not so limited and for that reason I wish to limit myself only within the scope of the appended claims.

What I claim is:

1. A fire-resistant, waterproof and weatherproof coating material comprising in major portion substantially equal parts by weight of any asphalt having a melting point of from 160° F. to 180° F. and a volatile asphalt solvent, and including in minor portion 3% to 5% by weight of powder-like, finely divided particles of silica aerogel uniformly dispersed in said asphalt and solvent and 5% to 15% by weight of a fire-retardant chemical.

2. A fire-resistant, waterproof and weatherproof coating material comprising in major portion of approximately 75% by weight substantially equal parts by weight of an asphalt having a melting point of from about 160° F. to 180° F. and a volatile asphalt solvent, and including approximately 4% by weight of powder-like, finely divided particles of silica aerogel uniformly dispersed in said asphalt and solvent, approximately 15% by weight of a fire-retardant chemical, and the remainder a mineral filler including short asbestos fibers.

3. A fire-resistant, waterproof and weatherproof coating material as defined in claim 2 and wherein said fire-retardant chemical includes in part a paraffin chlorinated to the extent of 20–50% by weight.

4. A fire-resistant, waterproof and weatherproof coating material comprising 37.4% by weight of asphalt having a melting point of from 160° F. to 180° F., 37.6% by weight of a volatile asphalt solvent, 4% by weight of powder-like finely divided particles of silica aerogel uniformly dispersed in said asphalt and solvent, a flame retardant including 5% by weight of ammonium carbonate and 10% by weight of ammonium sulphate, and 6% by weight of a mineral filler including short asbestos fibers.

References Cited in the file of this patent

UNITED STATES PATENTS

| | | |
|---|---|---|
| 1,943,532 | Howe | Jan. 16, 1934 |
| 2,093,454 | Kistler | Sept. 21, 1937 |
| 2,542,721 | Stafford | Feb. 20, 1951 |
| 2,583,603 | Sirianni et al. | Jan. 29, 1952 |
| 2,626,872 | Miscall | Jan. 27, 1953 |
| 2,667,425 | Bierly | Jan. 26, 1954 |

UNITED STATES PATENT OFFICE

CERTIFICATE OF CORRECTION

Patent No. 2,734,827

February 14, 1956

Robert M. Hooks

It is hereby certified that error appears in the printed specification of the above numbered patent requiring correction and that the said Letters Patent should read as corrected below.

Column 2, line 27, for "asbestos" read --silica aerogel--; column 4, line 51, for "of any" read --of an--.

Signed and sealed this 27th day of March 1956.

(SEAL)
Attest:
E. J. MURRY

Attesting Officer

ROBERT C. WATSON
Commissioner of Patents